United States Patent
Myers et al.

(10) Patent No.: US 8,330,493 B2
(45) Date of Patent: Dec. 11, 2012

(54) HIGH UTILIZATION UNIVERSAL LOGIC ARRAY WITH VARIABLE CIRCUIT TOPOLOGY AND LOGISTIC MAP CIRCUIT TO REALIZE A VARIETY OF LOGIC GATES WITH CONSTANT POWER SIGNATURES

(75) Inventors: Brent A. Myers, Palm Bay, FL (US); James G. Fox, Indialantic, FL (US)

(73) Assignee: Chaologix, Inc., Gainesville, FL (US)

( * ) Notice: Subject to any disclaimer, the term of this patent is extended or adjusted under 35 U.S.C. 154(b) by 11 days.

(21) Appl. No.: 12/903,782

(22) Filed: Oct. 13, 2010

(65) Prior Publication Data
US 2011/0085662 A1 Apr. 14, 2011

Related U.S. Application Data

(60) Provisional application No. 61/251,519, filed on Oct. 14, 2009, provisional application No. 61/358,664, filed on Jun. 25, 2010.

(51) Int. Cl.
*H01L 25/00* (2006.01)
*H03K 19/00* (2006.01)
*H03K 19/20* (2006.01)

(52) U.S. Cl. ............ 326/102; 326/38; 326/39; 326/104

(58) Field of Classification Search .............. 326/37–41, 326/46–47, 104, 112, 119, 121, 122
See application file for complete search history.

(56) References Cited

U.S. PATENT DOCUMENTS

| | | |
|---|---|---|
| 3,473,160 A | 10/1969 | Wahlstrom |
| 5,260,610 A | 11/1993 | Pedersen et al. |
| 5,291,555 A | 3/1994 | Cuomo et al. |
| 5,517,139 A | 5/1996 | Chung et al. |

(Continued)

FOREIGN PATENT DOCUMENTS
JP 2007532985 11/2007
(Continued)

OTHER PUBLICATIONS

International Search Report and Written Opinion dated May 30, 2011 for PCT/US2010/052489.

(Continued)

*Primary Examiner* — Shawki Ismail
*Assistant Examiner* — Jany Tran
(74) *Attorney, Agent, or Firm* — Saliwanchik, Lloyd & Eisenschenk

(57) ABSTRACT

Disclosed is a novel circuit able to generate any logic combination possible as a function of the input logic signals. The circuit is described as a 2 input logistic map circuit but may be expanded to 3 or more inputs as required. Further disclosed is a universal logic array with variable circuit topology. A metallization layer and/or a via interconnection between cells in the array elements produce a circuit topology that implements a Boolean function and/or chaotic function and/or a logic function. The novel circuit provides a circuit topology for secure applications with no obvious physical correspondence between control signal values and input to output mapping. Further disclosed is a network which has a power signature independent of input signal state and output transition. This provides a very useful circuit to protect data from decryption from power signature analysis in secure applications.

9 Claims, 14 Drawing Sheets

U.S. PATENT DOCUMENTS

| | | | |
|---|---|---|---|
| 5,745,655 | A | 4/1998 | Chung et al. |
| 5,809,009 | A | 9/1998 | Matsuoka et al. |
| RE35,977 | E | 12/1998 | Cliff et al. |
| 6,025,735 | A | 2/2000 | Gardner et al. |
| 6,803,787 | B1 | 10/2004 | Wicker, Jr. |
| 6,876,232 | B2 | 4/2005 | Yoo |
| 7,068,069 | B2 | 6/2006 | Fujita |
| 7,453,285 | B2 | 11/2008 | Kiel et al. |
| 2004/0036636 | A1 | 2/2004 | Mai et al. |
| 2006/0200514 | A1 | 9/2006 | Fischer et al. |
| 2008/0150578 | A1* | 6/2008 | Kiel et al. ............ 326/38 |

FOREIGN PATENT DOCUMENTS

WO    WO2008050938    5/2008

OTHER PUBLICATIONS

Murali et al., "Realization of the fundamental NOR gate using a chaotic circuit", Physical Review E, 01625 68:1-5, (2003).

Murali et al., "Implementation of NOR Gate by a Chaotic Chua's Circuit", Int'l J. of Bifurcation and Chaos, pp. 2669-2672, vol. 13, No. 9, (2003), World Scientific Publishing Company.

Munakata et al., "Chaos Computing: Implementation of Fundamental Logical Gates by Chaotic Elements", IEEE Transactions on Circuits and Systems-I: Fundamental Theory and Applications, pp. 1629-1633, vol. 49, No. 11, Nov. 2002.

Murali et al., "Experimental Chaos Computing", Submitted to IEEE Trans. on Circuits and Systems, pp. 1-4, in 2003.

* cited by examiner

FIG. 8

| xor_can | Con 0 | Con 1 | inv | Output Mapping |   |   |   |
|---|---|---|---|---|---|---|---|
|   |   |   |   | A: 0 B: 0 | A: 0 B: 1 | A: 1 B: 0 | A: 1 B: 1 |
| 0 | 0 | 0 | 0 | 1 | 1 | 1 | 1 |
| 0 | 0 | 0 | 1 | 0 | 0 | 0 | 0 |
| 0 | 0 | 1 | 0 | 1 | 1 | 0 | 1 |
| 0 | 1 | 1 | 1 | 0 | 0 | 1 | 0 |
| 0 | 1 | 0 | 0 | 1 | 0 | 1 | 1 |
| 0 | 1 | 0 | 1 | 0 | 1 | 0 | 0 |
| 0 | 1 | 1 | 0 | 0 | 1 | 1 | 1 |
| 0 | 1 | 1 | 1 | 1 | 0 | 0 | 0 |
| 1 | 0 | 0 | 0 | 1 | 1 | 1 | 1 |
| 1 | 0 | 0 | 1 | 0 | 0 | 0 | 0 |
| 1 | 0 | 1 | 0 | 0 | 1 | 1 | 1 |
| 1 | 0 | 1 | 1 | 1 | 0 | 0 | 0 |
| 1 | 1 | 0 | 0 | 1 | 1 | 0 | 1 |
| 1 | 1 | 0 | 1 | 0 | 0 | 1 | 0 |
| 1 | 1 | 1 | 0 | 1 | 0 | 1 | 1 |
| 1 | 1 | 1 | 1 | 0 | 1 | 0 | 0 |

HIGH UTILIZATION UNIVERSAL LOGIC ARRAY WITH VARIABLE CIRCUIT TOPOLOGY AND LOGISTIC MAP CIRCUIT TO REALIZE A VARIETY OF LOGIC GATES WITH CONSTANT POWER SIGNATURES

CROSS-REFERENCE TO RELATED APPLICATIONS

This application is based upon and claims priority from U.S. Provisional Patent Application No. 61/251,519, filed on Oct. 14, 2009 and U.S. Provisional Patent Application No. 61/358,664, filed on Jun. 25, 2010, the entire disclosure of each individual aforementioned application is herein incorporated by reference in their entirety.

TECHNICAL FIELD

The present invention generally relates to the field of dynamic computing and, more particularly, to configurable computing architectures for logic gates using non-linear elements and a universal logic array with variable circuit topology.

BACKGROUND

Conventional computing systems rely on static combinations of logic gates to implement one or more predefined Boolean algebraic functions and/or memory. Within static computing systems, the various hardware components of the computing system cannot be reconnected or reconfigured during operation. For example, the functionality of hardware components such as logic gates or memory latch cannot be dynamically changed once the component is fabricated.

Recently, a new paradigm in application specific integrated circuit (IC) design has begun to emerge. Due to the high cost of IC design and fabrication, companies have looked for ways to avoid the majority of IC fabrication costs by utilizing hardware that is electrically or metal/via programmed. The electrical example is the FPGA. Both logical programming and interconnect programming are possible by way of externally applied electrical programming signals. This methodology allows a single IC to be used for any reasonable logic requirement. The silicon is fixed and since it is used for multiple applications and customers, the cost is spread across all of these platforms and the high non-recurring expense (NRE) associated with full custom solutions is avoided (this could be well over multi-millions of dollars for 65 and 45 nm IC technology). An issue with FPGA technology is that to support any application, the overhead required for flexible logic and interconnect is extremely high. This may amount to 80-90% of the total die area.

All field-programmable circuit elements or cells are fixed in size and structure. All cells or fixed configurable logic element (CLE) of a FPGA are not utilized. This unused circuitry is inefficient, for both simple and complex functions. Moreover, there may be large amounts of the array simply not utilized because the total logic requirement is well below the array capability. These issues may not be problematic if designs have a low run rate in manufacturing, but if millions of pieces are required then customers lose margin by paying for silicon not utilized.

An alternative to classic Boolean logic circuits has been developed based on chaotic or non-linear elements known as Chua's circuit. This implements classic chaos theory behavior. The Chua circuit was first introduced in the early 1980s by Leon O. Chua, its ease of construction has made it a ubiquitous real-world example of a chaotic system.

Chua's circuit, although easy to implement with off the shelf discrete components, is not feasible to manufacture using integrated circuit technology because the necessary inductors and capacitors consume too much circuit area and the large number of operational amplifiers necessitate numerous transistors. Moreover, integrated circuits based on Chua's circuit, are often very difficult to control because the component values are very sensitive. Even a minor change to the component values often times cause chaotic oscillations to damp out.

BRIEF SUMMARY

What is disclosed is a novel circuit able to generate any logic combination possible as a function of the input logic signals. The circuit is described as a 2 input logistic map circuit but may be expanded to 3 or more inputs as required.

Further disclosed is a universal logic array with variable circuit topology. A metallization layer and/or a via interconnection between cells in the array elements produce a circuit topology that implements a Boolean function and/or chaotic function and/or a logic function.

In one embodiment, the logistic map circuit is comprised of a collection of j logistic map circuits. Each logistic map circuit r (r=1 to j) includes a first MOSFET device with a p-channel type configuration with a gate coupled to an $r^{th}$ input voltage (Vinr), a source coupled to a first current source (I1r) and a second MOSFET device with a n-channel type configuration with a gate coupled to the voltage source (Vinr), a drain coupled to a second current source (I2r). A common summing point for the first MOSFET source current and the second MOSFET drain current, the summing point formed as a current mirror with a common gate coupled to a drain of the first transistor and a source of the second transistor. The current mirror produces a summed non-linear output current $$Io = \sum_{r=1}^{j} Kr(Vinr - V_T)^2$$

that corresponds to one of a plurality of different logic gates responsive to adjusting input voltage (Vinr). Kr is a conductivity constant attribute of at least one of the first MOSFET device and the second MOSFET device. $V_T$ is a threshold voltage attribute of at least one of the first MOSFET device and the second MOSFET device. The first MOSFET source current and the second MOSFET drain current limit a value of output current (Io). Vinr is the input voltage and Kr is a MOSFET device conductivity constant and $V_T$ is a MOSFET device threshold voltage.

In another embodiment, a universal logic array with variable circuit topology is described. The universal logic array includes a plurality of array elements where each array element includes a first set of MOSFET devices with a p-channel type configuration and a second set of MOSFET devices with an n-channel type configuration. One or more of a metallization layer and/or a via connection are used to form an interconnection between the first set of MOSFET devices and the second set of MOSFET devices. Each array element may have different internal metallization and/or via connections to produce a circuit topology. The array elements implement Boolean functions and/or chaotic functions and/or logic functions. The chaotic function produces a non-linear output current that corresponds to one of a plurality of different logic gates responsive to adjusting an input voltage to the array element.

In another embodiment, a power signature independent topology is described which has properties such that the supply current is independent of input signal state and/or output signal transition and/or control signal state. Such a network has advantages in secure applications where it is desired to prevent detection of signal characteristics by indirect observation of power consumption. The technique may be further enhanced by providing a masking of input data based on mathematics of chaos theory.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which:

FIG. 8 is a table of non-linear or chaotic logic mapping for the universal logic circuit in FIGS. 5 and 6;

DETAILED DESCRIPTION

Figure 1:
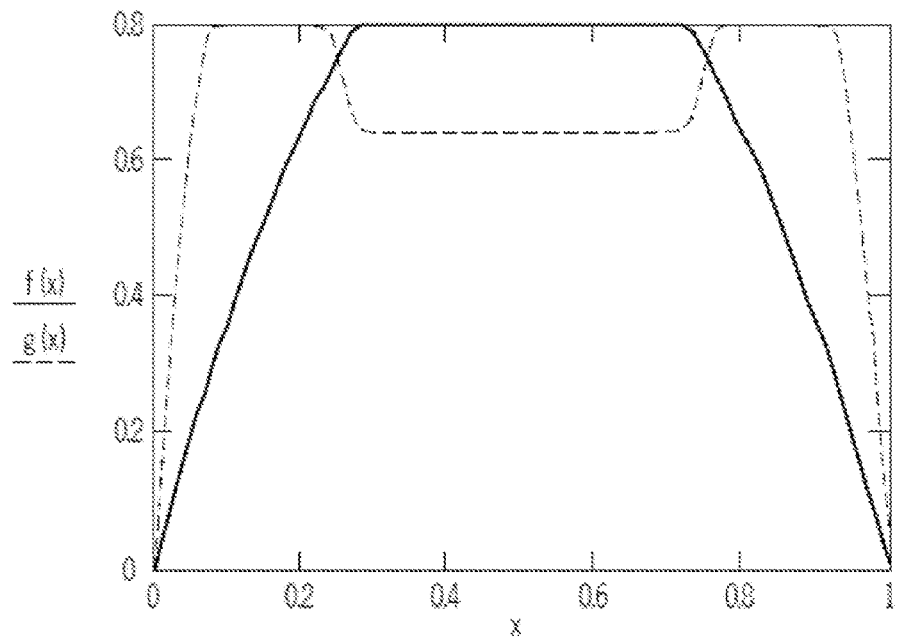
FIG. 1 is a plot of a prior-art mapping function of chaotic or non-linear iterates for the equation f(x) and g(x) for x*=0.8; f(x)=4x(1−x); and g(x)=f(f(x))

What is provided is a novel circuit able to generate any logic combination possible as a function of the input logic signals. The circuit is described as a 2 input circuit but may be expanded to 3 or more inputs as required. Further disclosed is a universal logic array with variable circuit topology. A metallization layer and/or a via connection between cells in the array elements produce a circuit topology that implements a Boolean function and/or chaotic function and/or a logic function.

The logistic mapping network of the present invention provides many advantages over prior art solutions. The logic map can realize any logic function and can be extended to 3 or more inputs through use of appropriate input multiplexing. The universal logic gate has greater functionality with fewer transistors than prior art along with a standard CMOS logic interface. Unlike prior art solutions no analog threshold inputs are necessary. The resulting current of the logistic map network acts as the thresholding variable thus simplifying realization.

To reduce the power and size of the non-linear circuit, improved circuit approaches are implemented which benefit from the intrinsic properties of integrated circuit transistors. Further, both the input logic voltage levels and output voltage levels are compatible with standard digital logic values. A benefit over the prior art is that the logistic map provides better electrical and physical security with substantially constant power dissipation during each function realized by the plurality of logic gates. Power dissipation is also substantially constant during changes of the input voltage. Such capability makes it difficult to ascertain information about input logic levels from monitoring changes in power dissipation. Such information could be used to determine secure encryption keys which could compromise private or secret data. By providing a network which has a power signature independent of logic level or transition changes, an inherently secure platform is created. Likewise, the universal logic array of the present invention provides many advantages over prior art solutions. Due to variable topology and circuit structure, the array fabric of the universal logic array provides maximum flexibility without the expense of circuit overhead. The universal array fabric can be configured to realize both simple and complex functions including Boolean and/or Chaotic functions and/or logic functions.

Further, the universal logic array can be configured to support fixed and configurable cells as well as sequential functions.

It is important to note that terms "non-linear" and "chaotic" have been used somewhat interchangeably in this disclosure. While it is necessary to have at least one non-linear element to implement a chaotic function, the reverse is not always true, i.e. a non-linear function does not have to use or implement a chaotic function. Accordingly, within the true scope and spirit of this invention, the term "non-linear" includes chaotic functionality and implementations. Whereas the term "chaotic" as used herein is only one example of a non-linear function.

Logistic Map Circuit Embodiment

A new chaotic cell has been developed which can realize any 2 input logic combination. A 2 input cell is able to produce any 2 input logic combination (for a 2 input cell this is 16 possible outputs). The chaotic cell or non-linear cell is based on the concept of the logistic mapping function, f(x) as described in U.S. Pat. No. 7,096,437 entitled "Method and Apparatus For A Chaotic Computer Module" with inventors William L. Ditto et al., (hereinafter "the Ditto patent") the teachings of which are hereby incorporated hereinto by reference in their entirety. In the Ditto patent the logistic mapping function is based on a function $f_1(x)$, where $f_1(x)=4ax(1-x)$ with a=1. Chaos is introduced by limiting the value $f_1(x)$ may take. For example, should $f_1(x)$ ever exceed a threshold x*, say x*=0.8, then $f_1(x)$ is set to equal the threshold value. Mathematically, the chaotic function f(x) may be expressed as $$f(x)=f_1(x) \text{ if } f_1(x)<x^*, x^* \text{ if } f_1(x)>x^* \quad (3\text{-}1)$$

$$f_1(x)=4x(1-x). \quad (3\text{-}2)$$

Chaos is demonstrated by plotting the value of f(x) vs. x. This is referred to as the first iterate of the chaotic function f(x). If the result of this calculation is then used as the input to the chaotic function, then this is referred to as the second iterate. Again, mathematically this is represented as the second iterate, g(x), defined as $$g(x)=f(f(x)). \quad (3\text{-}3)$$

An example plot of f(x) and g(x) is shown for the case where x*=0.8 in FIG. 1. More specifically, FIG. 1 is a plot that illustrates Chaotic or non-linear function iterates f(x) and g(x) for x*=0.8. f(x)=4x(1−x). g(x)=f(f(x)).

Unlike the prior art the present invention has a logistic map or chaotic cell which can realize any 2 input logic combination. For example, in each of the four rows below, shown are all the possible input combinations for two inputs A and B followed by all 16 possible outputs.

00=AB=>0 0 0 0 0 0 0 0 1 1 1 1 1 1 1 1
01=AB=>0 0 0 0 1 1 1 1 0 0 0 0 1 1 1 1
10=AB=>0 0 1 1 0 0 1 1 0 0 1 1 0 0 1 1
11=AB=>0 1 0 1 0 1 0 1 0 1 0 1 0 1 0 1

Unlike the prior art, the logistic map circuit is based on a specific chaotic mapping function that is consistent with integrated circuit MOSFET characteristics. Further, it combines thresholding and logic interface requirements to reduce complexity of the circuitry. The network is based on a chaotic mapping function f(x) that is similar to the current-voltage characteristics of a MOSFET transistor in the saturation state. By limiting the current value the MOSFET can obtain, a chaotic function is achieved. Specifically, the drain current, $I_D$, in saturation of a MOSFET transistor has an expression of the form $$I_D=K(Vgs-Vt)^2, \quad (3\text{-}4)$$

Where K is a constant depending on device size and transistor processing characteristics and has units of uA/V², Vgs is the gate to source voltage of the transistor, and Vt is the strong inversion threshold voltage of the transistor. As in the Ditto patent, the function is second order where x is replaced by Vgs. To show the function may take on chaotic behavior, consider the case where K=4, Vt=0.5 and the function is limited to a value of 0.75. Letting Vgs=x for consistency, the resulting chaotic iterates f(x) and g(x) are plotted in FIG. 2. More specifically, FIG. 2 is a plot of a mapping function of chaotic or non-linear iterates of a logistic map circuit of FIG. 3.

As can be seen, this function exhibits chaotic behavior. The function plotted in FIG. 2 is symmetric about the threshold voltage Vt=0.5. In reality, a single n-channel MOSFET transistor would have no current flow for Vgs<Vt. Hence, the chaotic behavior could not be identically reproduced. Fortunately however, the p-channel transistor has increasing current for Vgs<Vt and is the complement of the n-Channel device. The inventors discovered that by placing the n and p channel devices in parallel, the logistic MOSFET device mapping function can be realized. A common summing point for each MOSFET device is used to combine the individual MOSFET currents together to create the final network. A simplified schematic of this logistic mapping circuit is shown in FIG. 3.

Figure 2:
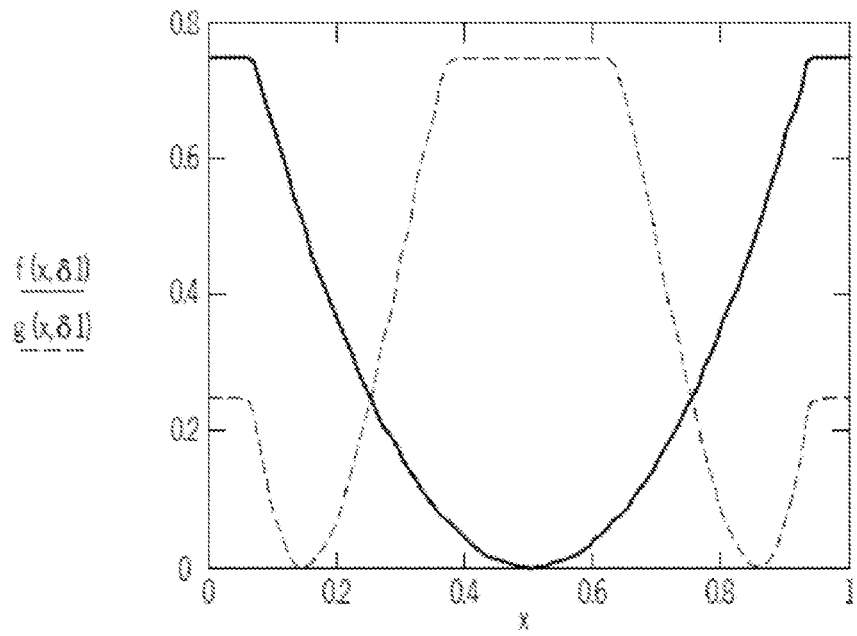
FIG. 2 is a plot of a mapping function of chaotic or non-linear iterates of a logistic map circuit of FIG. 3.
Figure 3:
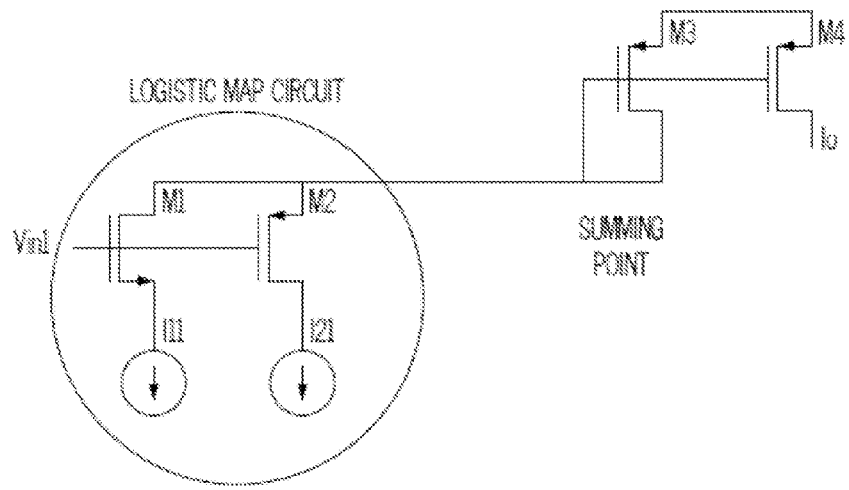
FIG. 3 is a logistic map circuit of a MOSFET device.

As can be seen with reference to the logistic mapping circuit of FIG. 3, the transistors M1 and M2 form the logistic mapping network that replicates the chaotic iterates shown in FIG. 2. Currents I11 and I21 are fixed current sources which limit the total current the devices pass, hence providing the limiting function required of the chaotic function. M3 and M4 form a current mirror which acts as a summing point for the drain and source currents M1 and M2 respectively. Additional inputs may be added simply by using the summing point as a common junction. The complete logistic map concept is shown in the simplified schematic of FIG. 4 illustrating a collection of j logistic map circuits for a MOSFET device of FIG. 3.

Figure 4:
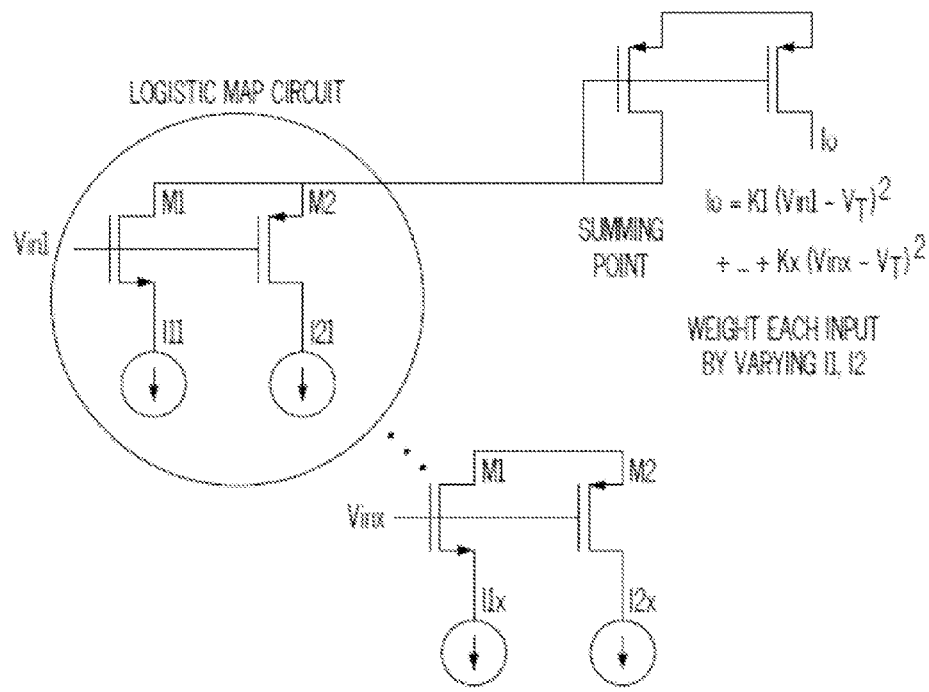
FIG. 4 is a collection of j logistic map circuits for a MOSFET device of FIG. 3.
Figure 5:
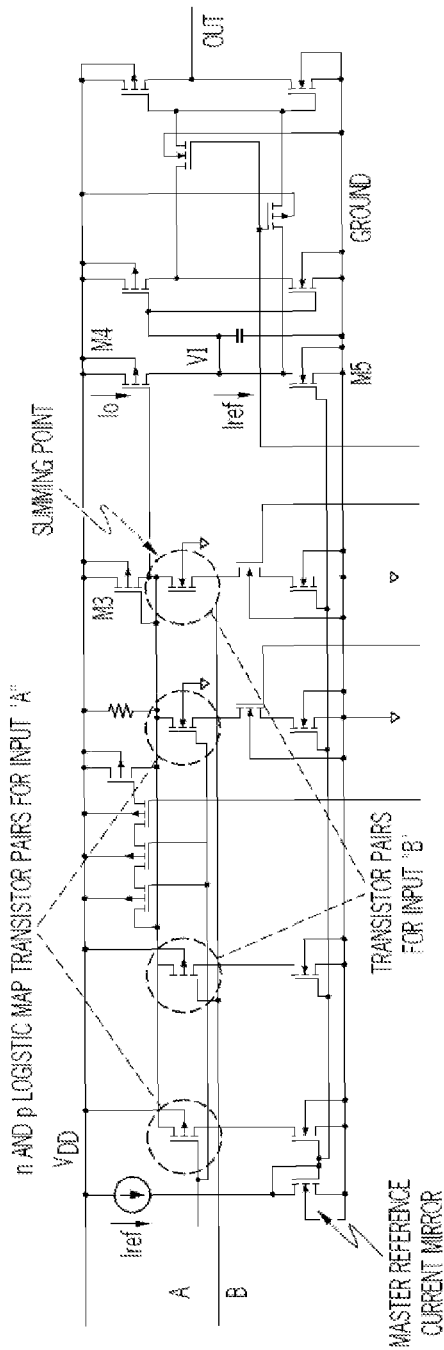
FIGS. 5 and 6 are a more detailed illustration of a two input universal logic gate utilizing the logistic map circuit of FIG. 3.
Figure 6:
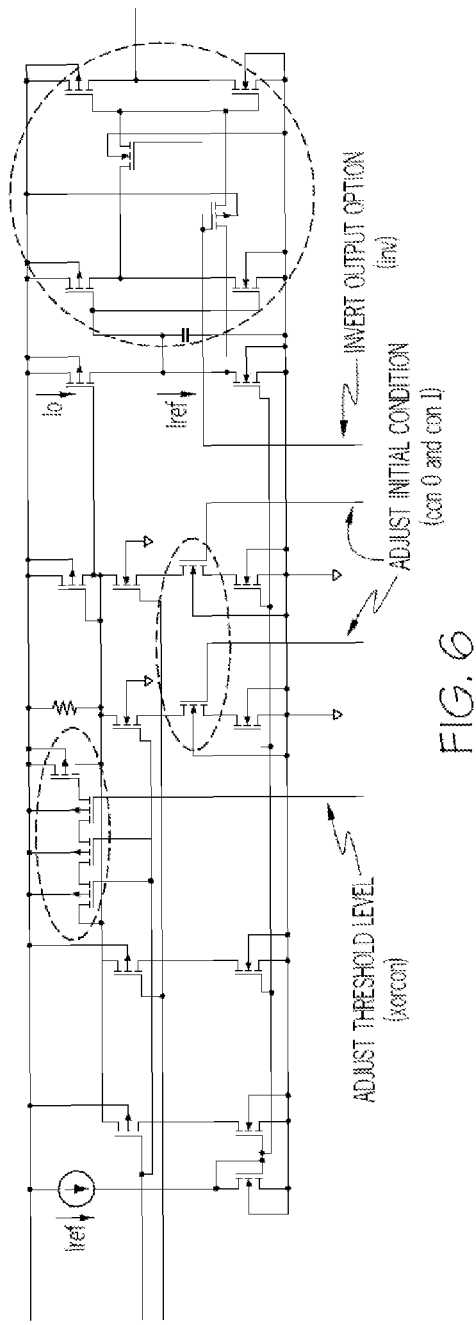

The complete MOSFET chaotic mapping simplified schematic of FIG. 4 includes not only the functionality described by the Ditto patent but also provides newly discovered features and benefits as well. For example, input signals are summed and processed by the logistic mapping function. Each input may have different current limiting values thus permitting a means to vary the total current summed at the summing point. This in essence provides a means to adjust the initial conditions present for a given set of input signals. Like the Ditto patent, the present invention permits adjusting the initial conditions as one means of providing different logic functions. The final current value is compared to a reference to determine the equivalent of a logic 1 or 0. This can best be described by considering the 2 input universal chaotic gate schematic shown in FIG. 5. Specifically, FIGS. 5 and 6 are a more detailed illustration of a two input logistic map circuit of a MOSFET device of FIG. 3. The key logistic map elements discussed so far are shown in FIG. 5. The logic gate has two inputs, A and B. The transistor pairs making up the logistic map for each input are identified in the FIG. 5. Transistors M3 and M4 provide the logistic map output current Io. The current Iref is generated from the master current mirror shown at the lower left in the FIG. 6. The current limit levels for both n and p devices (corresponding to I11 and I21 in FIG. 3) are set by current mirror scaling off of the master current mirror. In the current embodiment, the p channel portion of the transistor pair is a 1:1 scaling while the n channel is 3:5. This is one method to assure all logic combinations can be created. When Io>Iref, the resulting drain voltage V1 is pulled to Vdd (positive supply voltage). When Io<Iref, V1 is pulled down to ground. These voltage levels are exactly the voltage levels defined for CMOS logic levels. Hence, this simple approach provides both the comparison and logic output level conversion required to interface with standard CMOS logic. It should also be pointed out that the input signals A and B are CMOS logic level as well. There is no need for an input level translator. This is because the logistic map is symmetric around the value of the transistor threshold value, including input levels of Vdd (CMOS logic level 1) and ground (CMOS logic level 0). This greatly simplifies external circuit interface requirements. The remaining devices provide means to change the summing currents associated with each input and changing the output comparison threshold. These are highlighted in FIG. 6.

Figure 7:
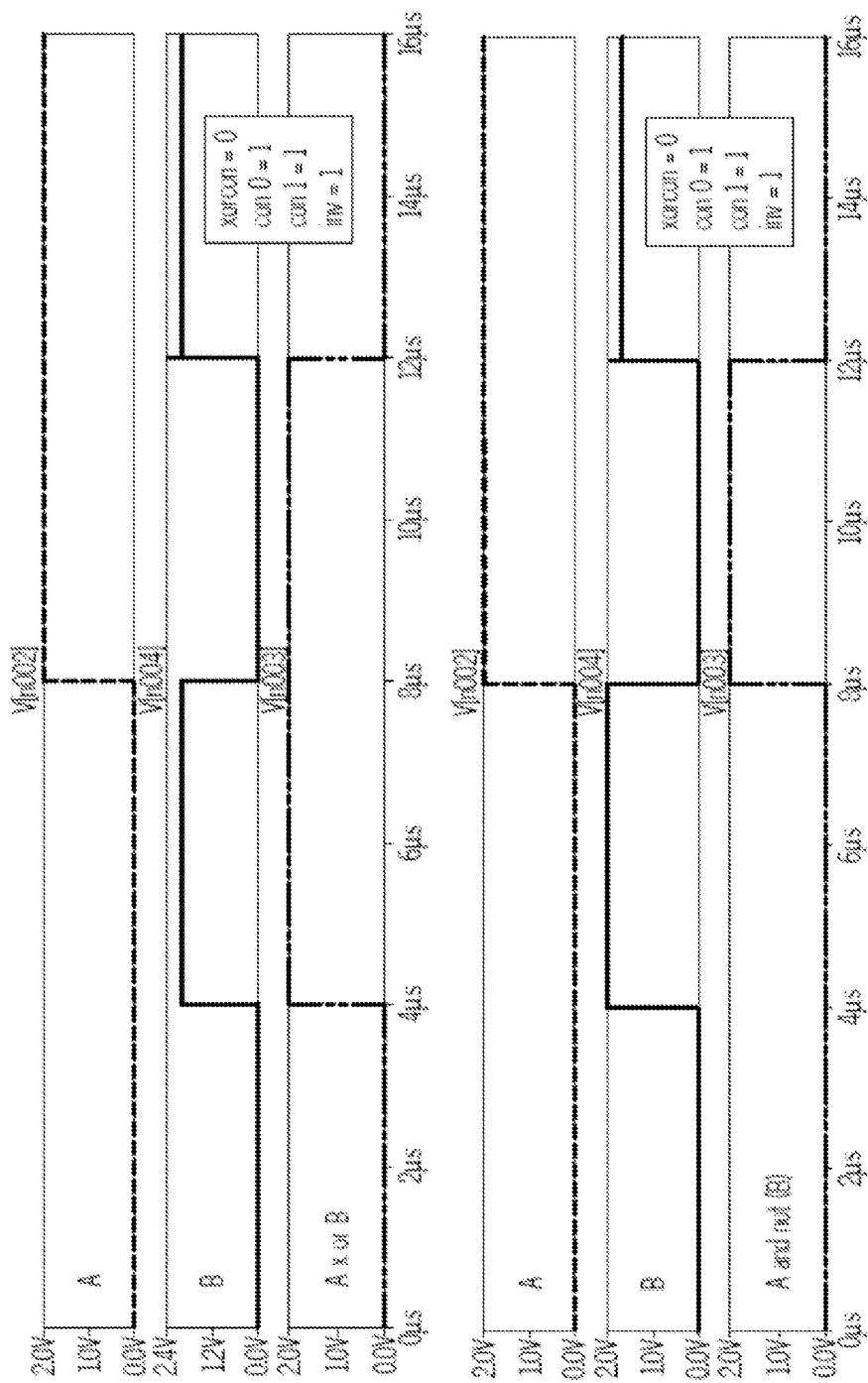
FIG. 7 is a plot of an output map and associated control levels of the universal logic circuit in FIGS. 5 and 6.

Since the circuit is capable of providing 16 possible output combinations, there are 4 external configuration signals necessary to generate these combinations. Starting from the left in FIG. 5, the four circled devices in the upper left serve to selectively adjust the output current Io if inputs A and B are both logic level 0. This in essence forces an asymmetry in the mapping function if it is desired to distinguish between both levels being high or low. Control signal "xorcon" is used to select this option. The center two control bits (con 0 and con 1) allow selection of input weighting (initial condition) on signals A and B separately. A series switch simply enables or disables the n-channel portion of the mapping pair which adjusts the signal current. This affects the final summed current that is compared to the reference current Iref and provides means to manipulate the logic function generated. Finally, the right most bit (inv) merely passes the resulting signal or inverts as required by the application. An example simulated response is shown in FIG. 7 for two different control configurations. Specifically, FIG. 7 is a plot of an output map and associated control levels of the logistic map circuit in FIGS. 5 and 6. The first case provides an exclusive-OR function. The second provides a complex function (A and not(B)).

FIG. 8 is a table of non-linear or chaotic logic mapping for the logistic map circuit in FIGS. 5 and 6. The table in FIG. 8 illustrates all 16 possible output mappings for the different combinations of input signal A and B as a function of the control bits. A close review of the table in FIG. 8 shows that all possible logic combinations are generated. Unlike a corresponding lookup approach however, there is no simple correspondence between the control signal values and the corresponding output mapping. The table is necessary to determine the output that would result. This provides an extra level of security that makes physical reverse engineering the cell functionality more difficult. This security feature is further described below.

Figure 9:
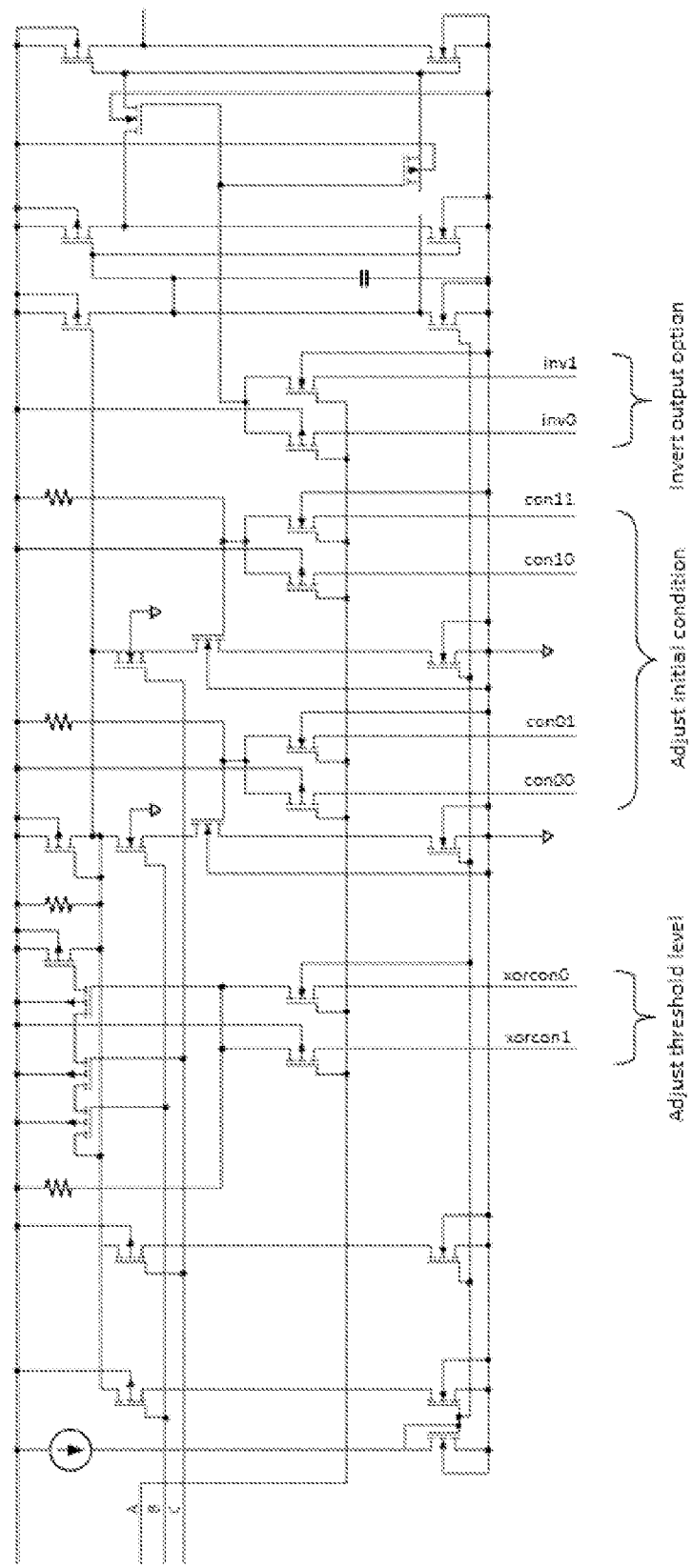
FIG. 9 is a more detailed illustration of a three input logistic map circuit of a MOSFET device of FIG. 3.

Three or more input cells may be constructed by adding multiplexers to the control bit inputs that allow the control to be changed as a function of the input signal. FIG. 9 is a more detailed illustration of a three input logistic map circuit of a MOSFET device of FIG. 3.

In summary, the new universal chaotic cell is an improvement over the previous art in several respects. All signal interfaces are consistent with CMOS logic levels. No external analog signals are required and the circuit is robust for all logic implementations. The circuit has no high impedance nodes which would be prone to noise contamination. It is capable of realizing all logic functions and provides a level of security since no obvious correspondence exists between the control signals and the resulting logistic mapping. As will be described, the cell provides a foundation for additional electrical security with substantially equal power dissipation independent of input logic levels or output transition. The circuit requires fewer devices and is expandable to 3 or more input cases.

Universal Logic Array with Variable Topology Embodiment

The universal logic array is used to replace the electrical programming with physical metal and via programming. This eliminates the need for programming devices and universal routing channels which then reduces overhead significantly. The platform for this design approach is the structured array. The array consists of a fixed configurable logic element (CLE) similar to the type disclosed by U.S. Pat. No. 7,453, 285 entitled "Dynamically Configurable Logic Gate Using A Non-Linear Element" with inventors Steven Lee Kiel et al. (hereinafter "the Kiel patent") which is commonly assigned herewith to Chaologix Inc., and incorporated by reference hereinto in its entirety. It may consist of other platform blocks such as random access memory, specific interfaces such as USB, HDMI, etc, and perhaps some limited analog blocks. Together, these functions provide a design platform, or structured array that customers can use to design their custom application. Customers choose from a variety of array types that most closely match their requirements. They only need customize the final metal and via levels. Hence, the majority of the IC processing cost is shared between multiple customers and the individual NRE cost is reduced significantly.

Figure 10:
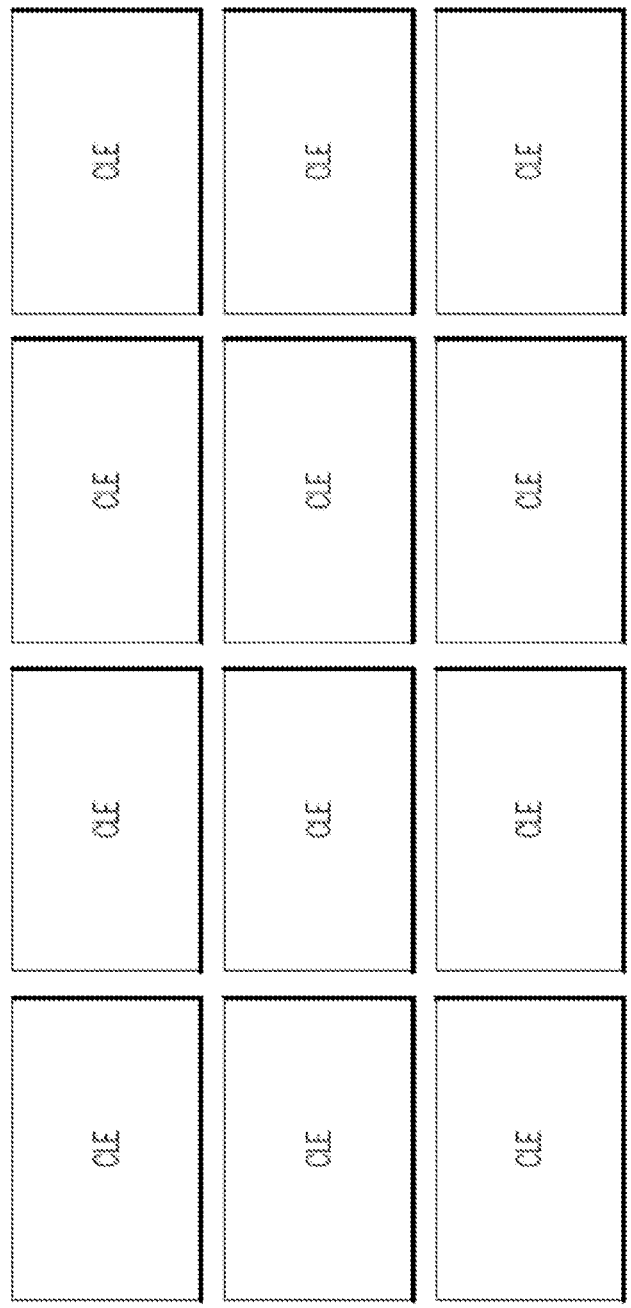
FIG. 10 is a prior art generic structure logic array.
Figure 11:
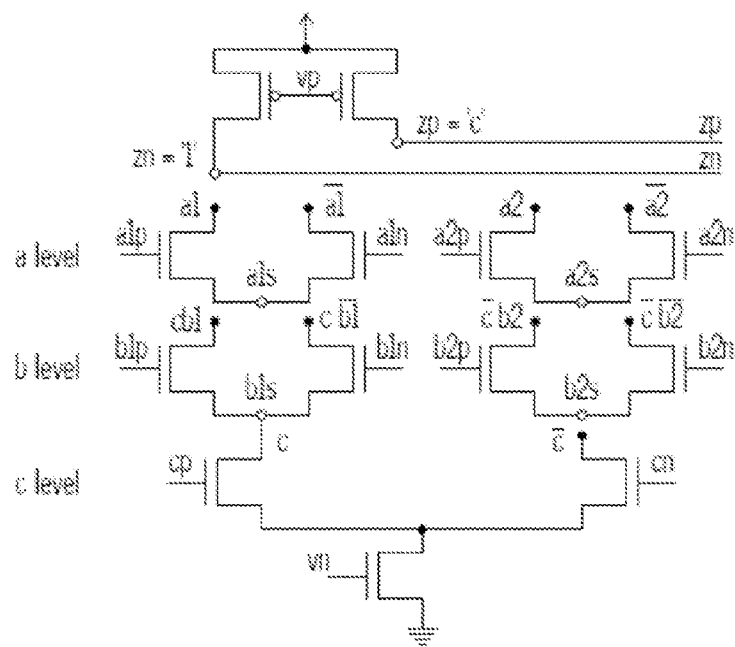
FIG. 11 is a prior art circuit implementation of a look up table in a configurable logic element of FIG. 10.
Figure 12:
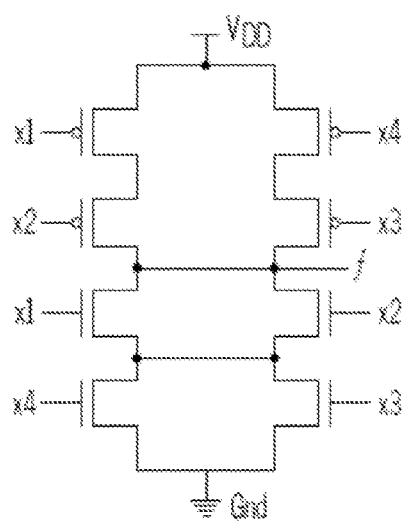
FIG. 12 is a prior art circuit implementation of a via only configurable logic block in a configurable logic element of FIG. 10.

A prior art generic structure logic array type discussed, such as described in the Kiel patent is shown in FIG. 10. Of course the array extends in both x and y directions up to the particular dimension depending on the array capability as defined by the manufacturer. The fixed configurable logic element (CLE) has a fixed circuit topology in each cell. Specifically, in this embodiment, the CLE may be configured to provide both logical and dynamic circuitry. All companies use a similar array type, but the array elements are designed to realize classical Boolean logic functions. Other example CLE, or array elements reported in the literature to date are shown in FIGS. 11 and 12. FIG. 11 is a prior art circuit implementation of a look up table in a configurable logic element of FIG. 10. FIG. 11 illustrates an array element based on a table look up network. It consists of 13 transistors. Devices are connected via metal and via's to realize any desired 3 input function. An example of inefficiency is the case of a NAND gate. The minimum device count for a static, complementary two input NAND gate is 4 devices. In this case, 9 devices are not utilized and imply area efficiency of well under 50%. FIG. 11 is a prior art circuit implementation of a look up table in a configurable logic element of FIG. 10;

FIG. 12 is a prior art circuit implementation of a via only configurable logic block in a configurable logic element of FIG. 10. FIG. 12 illustrates an improved CLE based on a more custom approach to creating logical functions. Here only 8 devices make up the entire CLE. The two input NAND gate example implies an improvement to 50% efficiency, but this is still poor. Further, these array types are incapable of realizing chaotic logic gates and hence are limited in scope.

Figure 13:
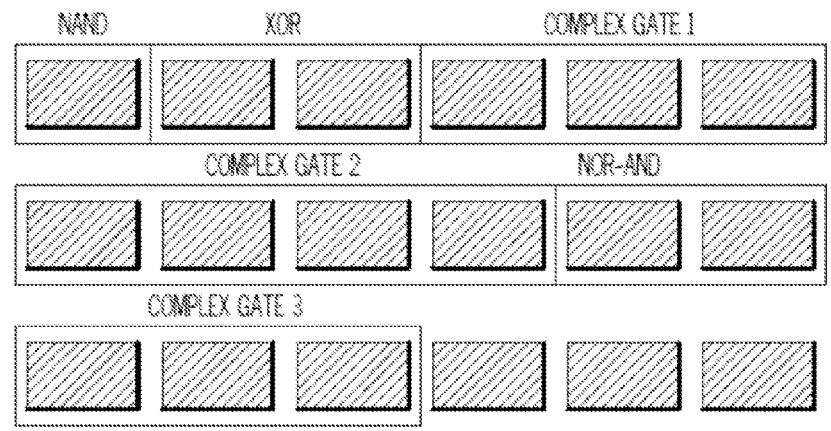
FIG. 13 is a universal logic array with variable topology.

An array concept that directly addresses each of these limitations is now described. Shown in FIG. 13 is a universal logic array with variable topology. The core element is not a circuit structure, but rather a combination of 4 or more transistors (2 n type and 2 p type for example). In cases where a simple gate requiring only four devices is required, only those four devices are interconnected. In cases where more complex functions are required, then adjacent cells are combined to form the higher functionality. In this way, the array has the greatest utilization. Further, the array is capable of realizing either Boolean or chaotic logic gates. This may be useful if the chaotic implementation is more efficient for some complex functions. The array can also realize sequential functions such as D latches or flip-flops.

Figure 14:
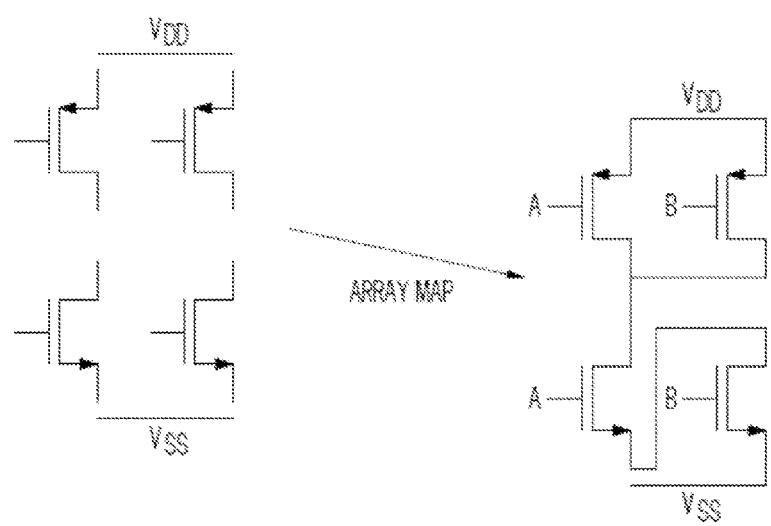
FIG. 14 is a circuit implementation of a two input NAND mapping of an element or cell of the universal logic array with variable topology of FIG. 13.

FIG. 14 is a circuit implementation of a two input NAND mapping of an element or cell of the universal logic array with variable topology of FIG. 13. Shown in FIG. 14 is how a four (4) device array element is mapped to a 2 input NAND gate.

Figure 15:
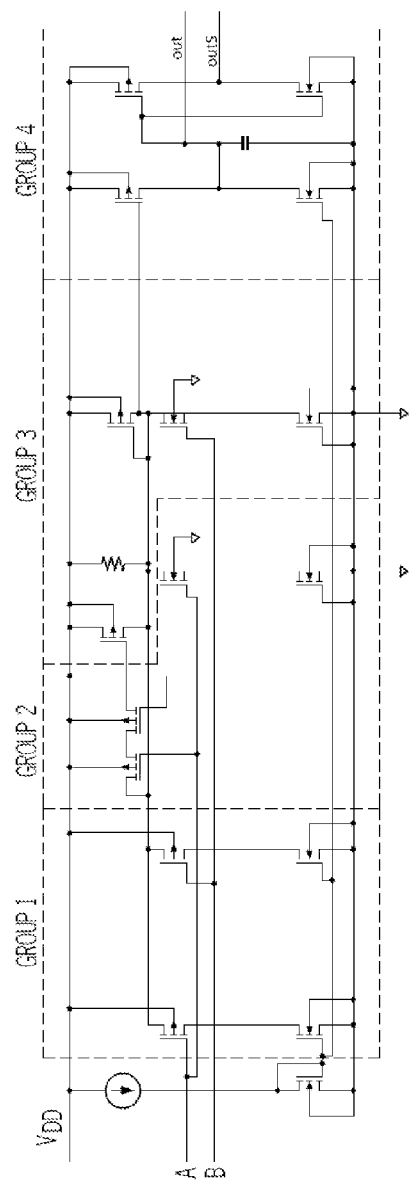
FIG. 15 is a more detailed implementation of non-linear or chaotic cell array partitioning of the universal logic array with variable topology of FIG. 13.
Figure 16:
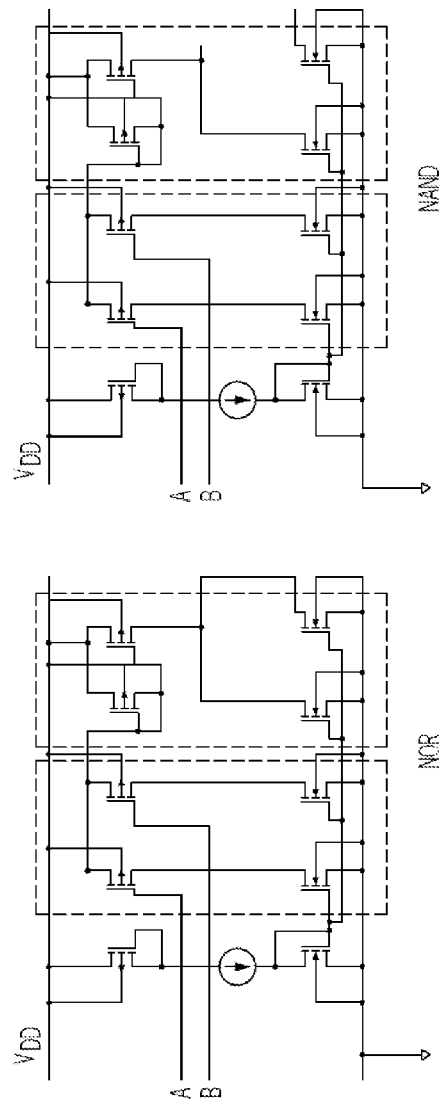
FIG. 16 is a NOR and NAND non-linear or chaotic gate array partitioning of the universal logic array with variable topology of FIG. 13.

FIG. 15 is a more detailed implementation of non-linear or chaotic cell array partitioning of the universal logic array with variable topology of FIG. 13. Shown in FIG. 14 is the partitioning of how a 2 input complex chaogate or non-linear element may be partitioned into 4 devices that if adjacently connected in the array, could realize any chaotic function. Examples of chaotic NOR and NAND gates are shown in FIG. 16. Specifically, FIG. 16 is a NOR and NAND non-linear or chaotic gate array partitioning of the universal logic array with variable topology of FIG. 13. In one embodiment, the array may be interconnected both vertically and horizontally. In another embodiment, it also includes programming transistors utilizing the array devices such that morphable or configurable gates can be constructed. In this way, the array can be configured to support single or multiple designs. In essence, the array provides a methodology to construct the optimum design utilizing either Boolean or chaotic blocks.

In summary, the proposed array concept is an approach to maximize flexibility without the expense of significant circuit overhead. The array in principle can be utilized to construct any one of Boolean, Chaotic, non-linear, configurable cell structures, logic functions, and/or sequential circuit networks.

Security Embodiments

In some government and secure communication applications, it is desirable to have electronic realizations which are difficult to reverse engineer, either through physical (de-processing IC for example) or electrical monitoring. Some applications encrypt data such that outside eavesdropping is very difficult. Encryption methods normally require some type of key for the intended receiver to be able to decipher received data. The Advanced Encryption Standard (AES) is a method used frequently in government or commercial applications to encode information for security reasons. Methods have been developed to monitor hardware power dissipation to deduce the keys necessary to decode the data. Hence, it is desirable to have a logic capability that has a power signature independent of the input signals, and/or the output signals, and/or the control signals. The inventors have discovered upon close inspection of the chaotic cell presented above that the cell is continuously biased and may be configured to have a power signature substantially independent of excitation signals and logic type by appropriate addition of shunt devices to maintain constant current as will be appreciated by those skilled in the art. Hence, electrically the chaotic cell has advantages for secure applications. It also provides a level of physical security not available in LUT based logic. FIG. 8 shows that there is no obvious correspondence between control signal settings and the resulting output signal. This lack of obvious correspondence between the input signals, and/or the output signals, and/or the control signals is an extra level of physical security. Further, electrical security is evident since power dissipation is substantially constant during each function realized by the plurality of logic gates and also the power dissipation is substantially constant for different inputs as well.

Figure 17:
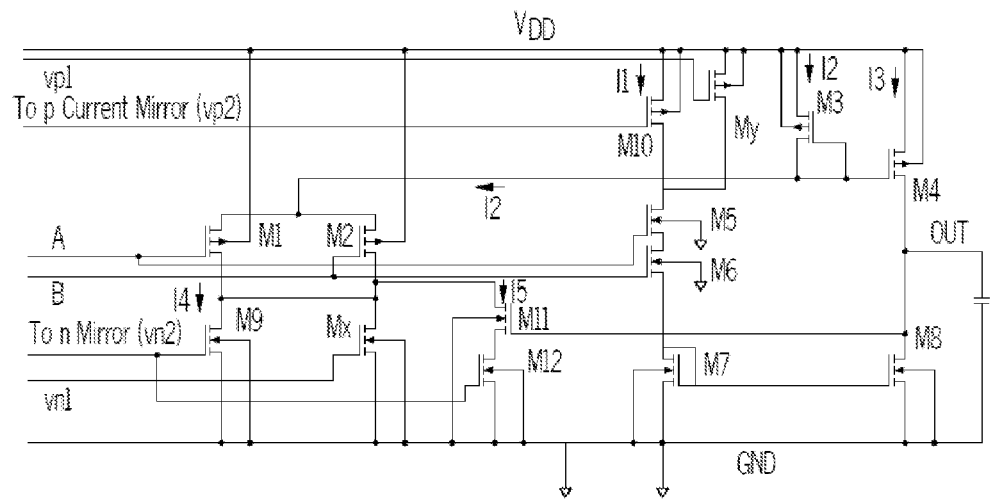
FIG. 17 is a NAND non-linear or chaotic gate logic circuit with a constant power signature.
Figure 18:
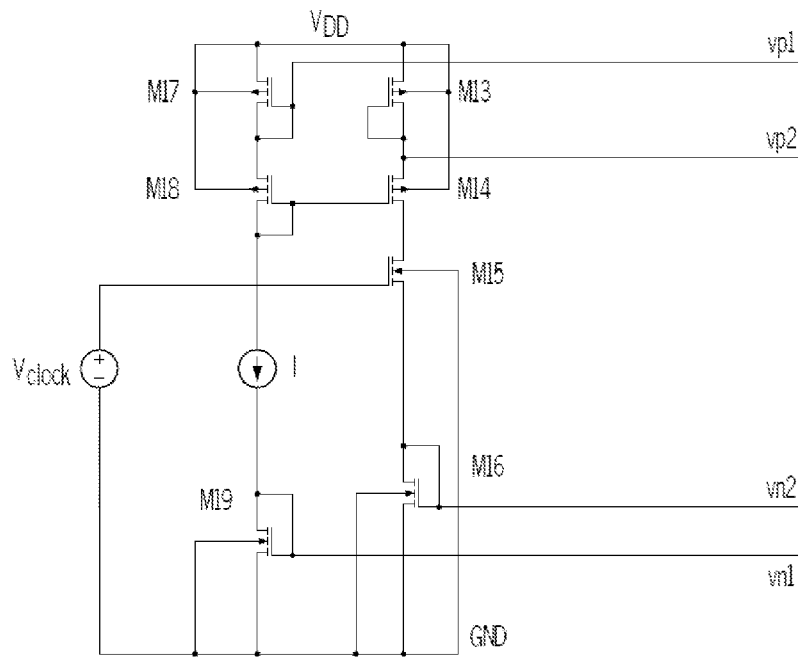
FIG. 18 is a bias circuit for NAND non-linear or chaotic gate logic circuit of FIG. 17.
Figures 19, 20:
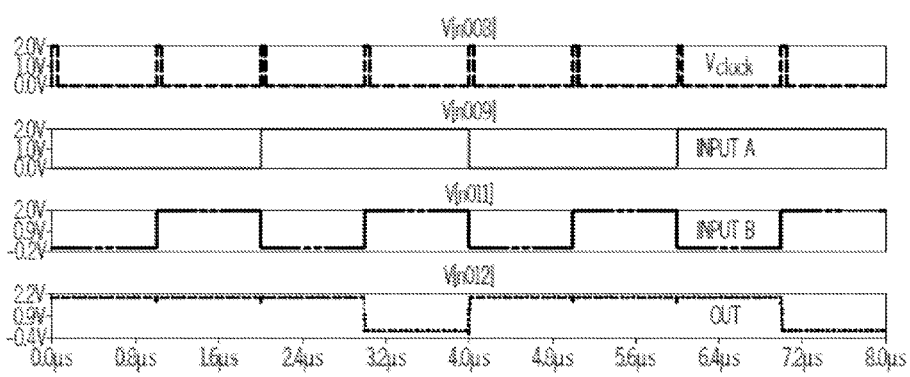
FIG. 19 is table of input logic levels, output logic levels with substantially constant supply current.
FIG. 20 is a timing diagram of the clock relationship using the bias circuit of FIG. 18.

To demonstrate that a cell can be created from slight modifications as described above, consider the implementation of a constant current logic circuit implemented as a NAND gate. The NAND cell is derived from the universal gate of FIG. 5 but with all programming devices removed such that only a NAND function remains. Further modifications are made to simplify the circuit as well as to optimize the power signature. The final circuit is shown in FIG. 17. Proper design calls for the same supply current to be sourced from the positive supply rail (VDD). Inspection shows that the total supply current is the sum of I1, I2, and I3. For any input logic level change or output transition change (either a logic zero or logic one transition), these currents must sum to the same value. This circuit utilizes a chaotic mapping function similar to the one described for the universal cell, but divided into a positive logistic map that pulls the output high for when either input is low, or a negative logistic map that pulls the output low when both inputs are high. This corresponds to a NAND function. The circuit is arranged such that even a low transition requires current be supplied from the positive rail. Operation is best understood by considering how current flows depending on the current state of the output level. For the following description, we will ignore devices Mx and My (to be considered later). I1 through I3 are set through current mirror operation. Both p and n channel master mirrors provide current that is steered based on input logic state. Consider the case when the output logic level is high. In this case, I3 is zero since the output device M4 is pinched off. Total current is the sum of I1 and I2. I1 will draw current only when both inputs are high as both M5 and M6 must be on for current to conduct. If either input is low, I1 is zero. In this case, I2 must be enabled. Further, I1=I2 is required to assure a constant supply current. This is accomplished through devices M1 and M2 connected in parallel and routing current supplied by M5 (I4) and M9 (I5) to provide source current I2. More detail on the role of device M9 will be provided shortly. I1 and I2 are easily set to the same value by assuring all current mirror ratios are consistent as will be appreciated by those skilled in the art. In summary for the high output case, I1 will be active for either input being low. I2 will be active for both inputs high. I1=I2 is a constraint and hence current from the supply is constant for all input cases. Now consider the case for when the output is low. For this to have occurred, both inputs must have had a previous value of logic level 1. In this case, I1 is active but I2 is zero. For any change of input level, I1 will transition to a zero and I2 will increase to a nominal value equal to the original value of I1. However, I3 will now increase as well in order to charge the output level to a high (logic level 1) value. I2 acts as the primary master mirror current to I3 via the mirror circuit composed of M3 and M4. Now the total supply current is the sum of I2 and I3. This is problematic unless the sum is equal to the value of I2 for the case where the output level was zero. This is solved by adding the feedback network alluded to earlier. M9 senses when the output is high and acts as a valve to increase the value of I2. When the output is low, I2 is reduced such that the new supply current (I2+I3) has the same value as I2 when the output was high. It is a simple matter to generate these currents through aspect ratio selection (M9, M10, M12) as known by those skilled in the art. As example, a bias network which may be used to generate a master current reference is shown in FIG. 18. Here, the circuit generates bias voltages vn2 and vp2 from a reference bias current I. These bias voltages act as the master current mirror such that the current I is mirrored based on the aspect ratio between the slave devices in FIG. 17 (M9, M10, M12) and the master devices in FIG. 18 (M16, M14, M16) respectively. Note that M16 acts as master to both M9 and M12. Note that device M15 acts as a switch such that the master bias current may be set to zero. This provides a means to bias the logic gate in a controlled fashion by application of control voltage Vclock. More detail on this will be provided later. Defining the aspect ratio correspondence between devices in the gate (FIG. 17) and the bias network (FIG. 18) as (M16:M9, M14: M10, M16:M12) one solution to providing constant current independent of input logic level is (1:1, 1:2, 1:1). FIG. 19 shows the relationship for I1, I2, I3, and total supply current for different input logic levels (A, B) and output transition states for this selection of aspect ratio. The currents are referenced to the master reference current I in FIG. 18. It is clear that the total supply current is constant independent of input and output state.

Any logic gate can be constructed in a similar fashion by establishing a pull up, or positive logistic map network (M1, M2, M3 and M4 for the NAND), a pull down, or negative logistic map network (M5, M6, M7, M8 for the NAND), and associated current mirrors to provide sink and source current (M9 and M10 in the NAND). A feedback network from the output to either or both logistic maps in order to assure constant current for any output state may be added (M11 and M12 in the NAND). Such a design procedure may be used to create any logic function that is inherently power signature neutral by providing a constant supply current for any combination of input levels (Boolean logic level zero or one) and present output states. The supply transition current (as output changes from zero to one or one to zero) is constant as well.

Figure 21:
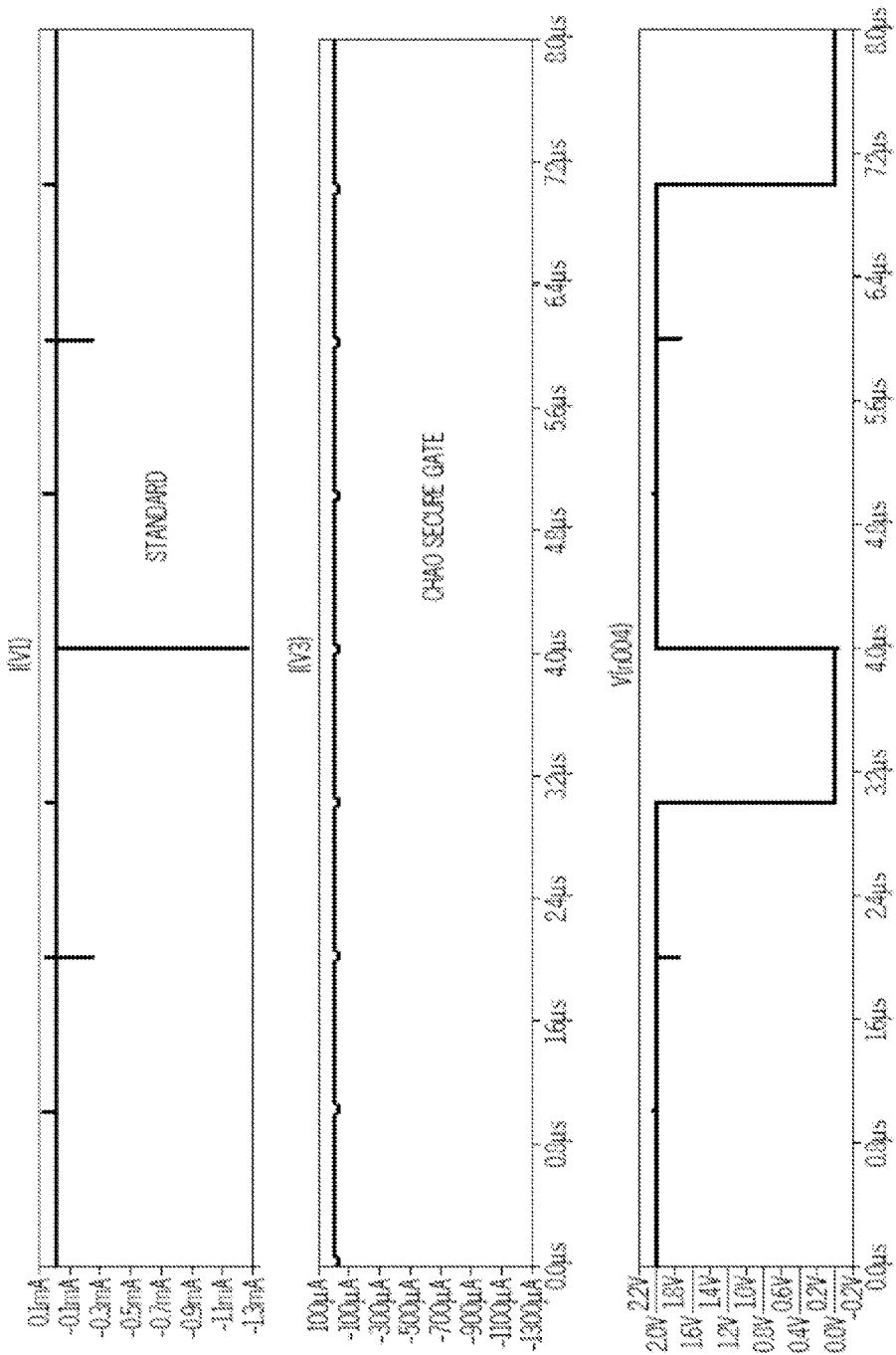
FIG. 21 is a comparison diagram of supply current for a prior art NAND gate and the logic circuit of FIG. 18.

A limitation of the circuits described thus far is that current is supplied for all time periods. While this assures a constant power signature independent of logic level and output state, it also suggests a higher overall power dissipation except for very fast applications. A simple means to address this is by clocking the circuit only when a signal transition is possible. This is accomplished by the addition of device M15 in FIG. 18. Supplying a signal which is synchronized to possible logic level transitions assures that the gate is active only during transition periods. Since the gate is clocked at any possible transition, the power signature is constant regardless of whether an input changed state or not. Addition of the clocking circuit provides the means to control power and assure the power signature is constant. The relationship between the clock and input transitions is shown in FIG. 20. It is a simple matter to generate a clock signal utilizing one shot or other circuit techniques as can be appreciated by those skilled in the art. To assure the output remains in a known state, small pull down or pull up devices are used in between clock pulses. Referring to FIG. 17, these are devices Mx and My. Both are long aspect ratio devices and driven by the master bias generator (FIG. 18), specifically devices M19 and M17 respectively. FIG. 21 shows a comparison of a standard NAND gate and the Secure gate described above. The top plot shows supply current for a standard NAND gate. The second plot shows the current for the described secure NAND gate. It is clear that the supply current is constant for each input transition and much smaller in magnitude.

It should be understood with reference to FIGS. 17-21 that a power signature independent topology is achieved which has properties such that the supply current is independent of input signal state and/or output signal transition and/or control signal. Further, as will be appreciated by those skilled in the art, similar techniques may be applied to universal cells such that power dissipation is independent of control signal values. Such a secure circuit has advantages in applications where it is desired to prevent detection of signal characteristics indirectly by observation of power supply current characteristics, and/or to prevent other side-channel attacks. A more complex constant current logic network may be constructed by interconnecting any combination of secure logic circuits. Typically an encryption or decryption block would be constructed with such secure logic circuits. This would prevent secure data from being deduced by observation of the power signature of the encryption/decryption block.

In many secure systems, an approach to enhancing security is to mathematically modify or mask the original data inputs to such encryption/decryption blocks in a way that the data appears random and even if it is deduced from power signature analysis, the random nature "masks" what the original data was. Data masking forms an output which is structurally similar to the original data but inauthentic and many times simply unintelligible. A random number generator provides a given random value that is applied in current masking solutions to the input of the encryption block. The same random number is then applied to the output of the encryption block. At the decryption block the same process is used. A given random number is applied to the input of the decryption block and to the output of the decryption block. In such a data masking technique the mask doesn't transfer with the data (or some seed by which the mask is generated) but is applied on the fly real-time to the input and output of the encryption/decryption block.

Random number generators are well-known in the art and commercially available from various known sources. Random number masking is currently used as a countermeasure for DPA type attacks. However there are vulnerabilities based on the fact that in many cases the 'randomness' of the data is not truly random and if the methodology for determining the random variable is understood the masking is not a deterrent. There are other more complex numerical techniques that are utilized in conjunction with DPA to thwart masking as a countermeasure (see for example "Software mitigations to hedge AES against cache-based software side channel vulnerabilities. Cryptology ePrint Archive, Report 2006/052, February 2006") the teachings of which are incorporated by reference in its entirety. In one embodiment, the present invention provides a more robust solution to the use of random numbers though a chaotic function. This chaotic masking function can be used to augment existing data masking techniques. Further this chaotic masking function can be used in conjunction with the continuously biased chaotic cell encryption/decryption circuit described above. In another embodiment, the chaotic masking is used alone with existing encryption/decryption modules.

Figure 22:
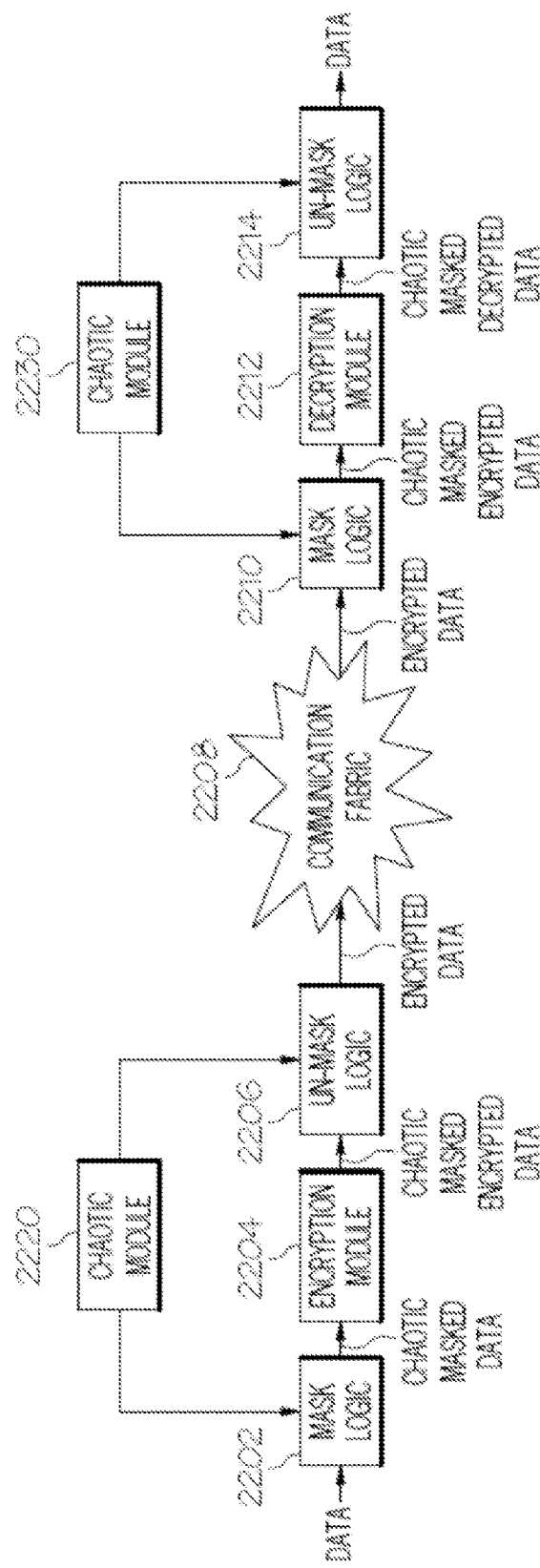
FIG. 22 is a block diagram of a chaotic masking application used with encryption.

The use of chaotic masking function will now be described with reference to FIG. 22. Shown is a block diagram of a chaotic masking application used with encryption.

This chaotic masking application begins with Data, such as multimedia data including text, audio, picture and video data is fed into a Mask Logic module 2202. Chaotic Module 2220 supplies a given value (or encryption mask value) of a chaotic function to the mask module 2204 as shown. This Chaotic Module 2220 and 2230 can be any number of inputs or bits or number of chaotic iterations in length from 1 to n. The higher number bits will provide higher masking security. One example of a Chaotic Module 2220 and 2230 is found in FIG. 1, where for a given input, a corresponding chaotic value is provided. The use of chaos theory enhances masking prior to encryption. Next the Masked Chaotic Data is encrypted in Encryption module 2206. Any type of encryption can be implemented in this masked chaotic data embodiment, such as symmetric, key-based, public key encryption, and AES, are but a few examples as well as the continuously biased chaotic cell encryption/decryption circuit described above. The Encrypted Chaotic Masked Data is then unmasked in Unmask module 2206 using the same given chaotic value previously used to mask the data from the Chaotic Module 2220 (i.e. the encryption mask value). The encrypted data is stored or transmitted over a communication fabric 2208. The communication fabric 2208 can be any wired or wireless communication fabric whether secure or unsecure. In another embodiment the network is a DVD or other tangible recording medium such as a USB memory stick for distribution.

At the receiving end, the encrypted data is fed into a Mask Logic module 2210. As in the front end encryption process, a Chaotic Module 2230 is used to provide a chaotic value. The Chaotic Module 2230 can be the same chaotic module as Chaotic Module 2220 or a different chaotic Module. The chaotic value (i.e. decryption mask value) is applied in the Mask Logic module 2210. Next, the Chaotic Masked Encrypted Data is fed into decryption module 2212 to decrypt. The Chaotic Masked Decrypted data is then fed into a Un-mask Module 2214 that applies the same chaotic value (i.e. decryption mask value) from Chaotic Module 2230 to produce the data.

It is important to note that the Chaotic module 2220 and 2230, masking logic 2204 and un-mask logic 2206 and the Encryption module 2204 and Decryption module 2212 can be realized in hardware or a combination of hardware and software. Any kind of computer system—or other apparatus adapted for carrying out the methods described herein—is suited. A typical combination of hardware and software is a general-purpose computer system with a computer program that, when loaded and executed, controls the computer system such that it carries out the methods described herein.

An embodiment of the processing portion of the present invention can also be embedded in a computer program product, which comprises all the features enabling the implementation of the methods described herein, and which—when loaded in a computer system—is able to carry out these methods. Computer program means or computer programs in the present context mean any expression, in any language, code or notation, of a set of instructions intended to cause a system having an information processing capability to perform a particular function either directly or after either or both of the following a) conversion to another language, code or, notation; and b) reproduction in a different material form.

A computer system may include, inter alia, one or more computers and at least a computer readable medium, allowing a computer system to read data, instructions, messages or message packets, and other computer readable information from the computer readable medium. The computer readable medium may include non-volatile memory, such as ROM, flash memory, disk drive memory, CD-ROM, and other permanent storage. Additionally, a computer readable medium may include, for example, volatile storage such as RAM, buffers, cache memory, and network circuits connected to network. Furthermore, the computer readable medium may comprise computer readable information in a transitory state medium such as a network link and/or a network interface, including a wired network or a wireless network, that allow a computer system to read such computer readable information.

This chaotic masking embodiment provides a novel masking approach based on the mathematics of chaos theory. This novel masking is an enhancement to masking techniques used today. Such masking in combination with the inherent secure cell described above would offer substantially increased security, as each element alone is secure by itself. However, in situations where the secure hardware cell may not be available, masking the data with a chaotic based masking algorithm would provide sufficient security on a software based approach alone.

Non-Limiting Examples

The circuit as described above is part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a silicon wafer. The photolithographic masks are utilized to define areas of the silicon wafer (and/or the layers thereon) to be etched or otherwise processed.

The method as described above is used in the fabrication of integrated circuit chips.

The resulting integrated circuit chips can be distributed by the fabricator in raw wafer form (that is, as a single wafer that has multiple unpackaged chips), as a bare chip, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard, or other input device, and a central processor.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A universal logic array with variable circuit topology comprising:

a plurality of array elements where each array element includes a first set of MOSFET devices with a p-channel type configuration and a second set of MOSFET devices with an n-channel type configuration;

at least one of a metallization layer and a via connection to form an interconnection between one or more of the first set of MOSFET devices and the second set of MOSFET devices in at least one of the array elements to produce a circuit topology to implement at least one of a Boolean function and a chaotic function and a logic function; and at least one cell as defined by the circuit topology within each of at least two array elements combined with additional interconnections formed by the metallization layer and the via connection between the two array elements, wherein the at least one cell includes a cell providing a chaotic function, wherein the cell providing the chaotic function comprises a current mirror producing non-linear output current ($I_O$) proportional to $I_O=K1(V_{in1}-V_{T1})^2+K2(V_{in2}-V_{T2})^2$ that corresponds to one of a plurality of different logic gates responsive to adjusting an input voltage to the at least two array elements of the cell providing the chaotic function, where K1 is a conductivity constant attribute and $V_{T1}$ is a threshold voltage attribute of at least one of the first set of MOSFET devices and the second set of MOSFET devices of the at least two array elements forming the cell providing the chaotic function and receiving input voltage $V_{in1}$, and where K2 is a conductivity constant attribute and $V_{T2}$ is a threshold voltage attribute of another of at least one of the first set of MOSFET devices and the second set of MOSFET devices of the at least two array elements forming the cell providing the chaotic function and receiving input voltage $V_{in2}$.

2. The universal logic array of claim 1, wherein the circuit topology implements both the Boolean function and the chaotic function.

3. The universal logic array of claim 1, wherein the at least one cell further includes a cell providing at least one of the Boolean function and the logic function.

4. The universal logic array with variable circuit topology of claim 1, wherein the current mirror produces the non-linear output current ($I_O$) proportional to $I_O = K1(V_{in1} - V_{T1})^2 + K2(V_{in2} - V_{T2})^2$ that corresponds to one of the plurality of different logic gates corresponding to at least one of:
an AND gate;
a NAND gate;
an OR gate;
an XOR gate;
a NOR gate;
a XNOR;
a NOT gate;
a ONE gate; and
a ZERO gate.

5. The universal logic array with variable circuit topology of claim 1, wherein a power signature of the cell is substantially constant during each logic gate function realized by the cell.

6. The universal logic array with variable circuit topology of claim 5, wherein the power signature of the cell is substantially constant during adjustment of at least one of the input voltage ($V_{in1}$) and the input voltage ($V_{in2}$).

7. The universal logic array with variable circuit topology of claim 5, comprising a current feedback path from an output of the cell to a master reference current mirror for the cell for providing the substantially constant power signature of the cell.

8. The universal logic array with variable circuit topology of claim 1, wherein the cell providing the chaotic function comprises a logistic map circuit.

9. The universal logic array with variable circuit topology of claim 8, wherein the logistic map circuit comprises:
a first MOSFET device with a p-channel type configuration from the first set of MOSFET devices of one of the at least two array elements, the first MOSFET device having a gate coupled to the input voltage ($V_{in1}$) and a source coupled to a first current source to establish a first MOSFET source current;
a second MOSFET device with an n-channel type configuration from the second set of MOSFET devices of one of the at least two array elements, the second MOSFET device having a gate coupled to the input voltage ($V_{in1}$) and a drain coupled to a second current source to establish a second MOSFET drain current;
a third MOSFET device of a p-channel type configuration from the first set of MOSFET devices of one of the at least two array elements, the third MOSFET device having a gate coupled to the input voltage ($V_{in2}$) and a source coupled to a third current source to establish a third MOSFET source current;
a fourth MOSFET device of an n-channel type configuration from the second set of MOSFET devices of one of the at least two array elements, the fourth MOSFET device having a gate coupled to the input voltage ($V_{in2}$) and a drain coupled to a fourth current source to establish a fourth MOSFET drain current;
a fifth MOSFET device of a p-channel type configuration from the first set of MOSFET devices of one of the at least two array elements; and
a sixth MOSFET device of a p-channel type configuration from the first set of MOSFET devices of one of the at least two array elements,
wherein the fifth MOSFET device and the sixth MOSFET device have a common gate configuration and form the current mirror,
wherein the current mirror provides a summing point for the first MOSFET source current, the second MOSFET drain current, the third MOSFET source current and the fourth MOSFET drain current by coupling the common gate of the current mirror to a drain of the first MOSFET device, a source of the second MOSFET device, a drain of the third MOSFET device and a source of the fourth MOSFET device,
where for $I_O = K1(V_{in1} - V_{T1})^2 + K2(V_{in2} - V_{T2})^2$, K1 is the conductivity constant attribute of at least one of the first MOSFET device and the second MOSFET device, $V_{T1}$ is the threshold voltage attribute of at least one of the first MOSFET device and the second MOSFET device, K2 is the conductivity constant attribute of at least one of the third MOSFET device and the fourth MOSFET device, and $V_{T2}$ is the threshold voltage attribute of at least one of the third MOSFET device and the fourth MOSFET device.

* * * * *